Figure 9:
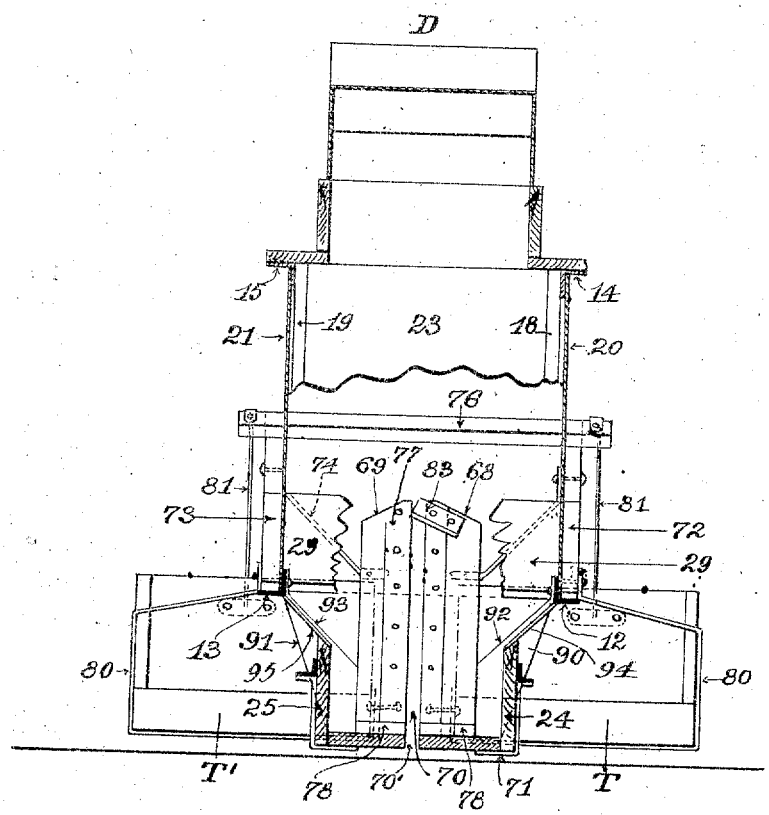

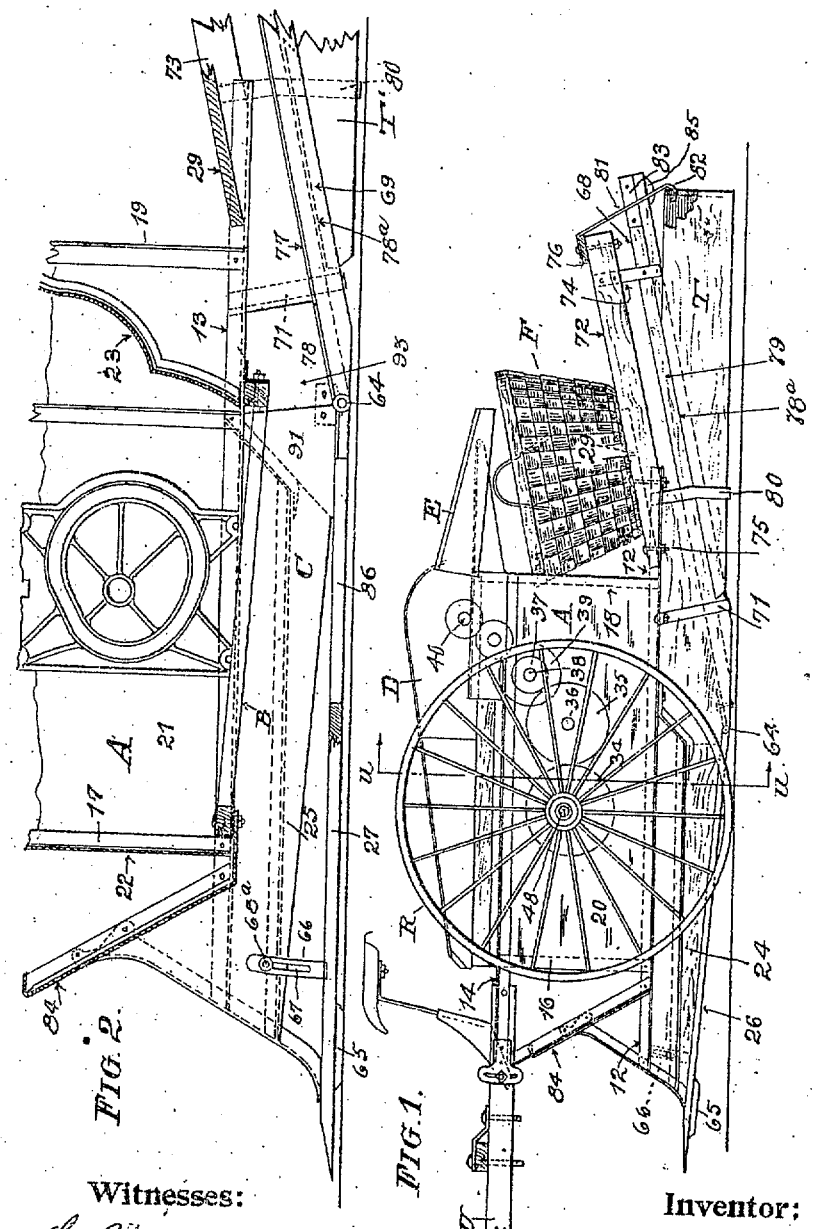

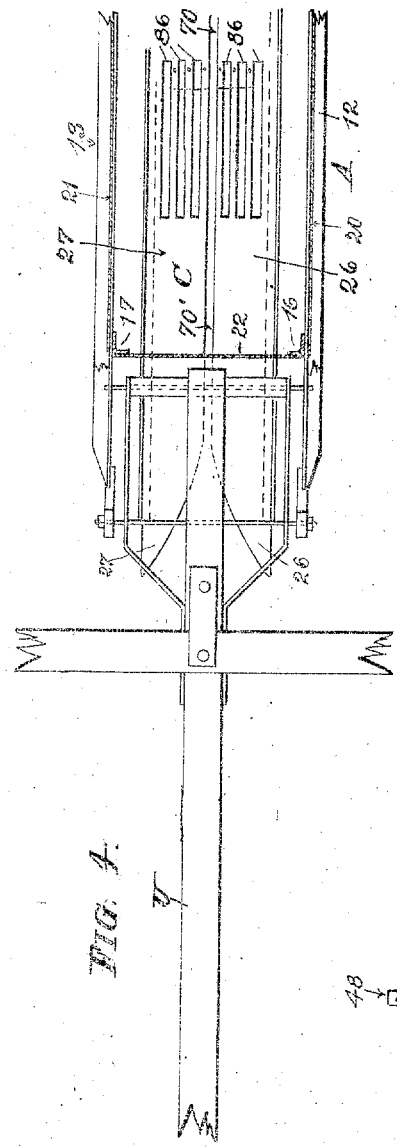
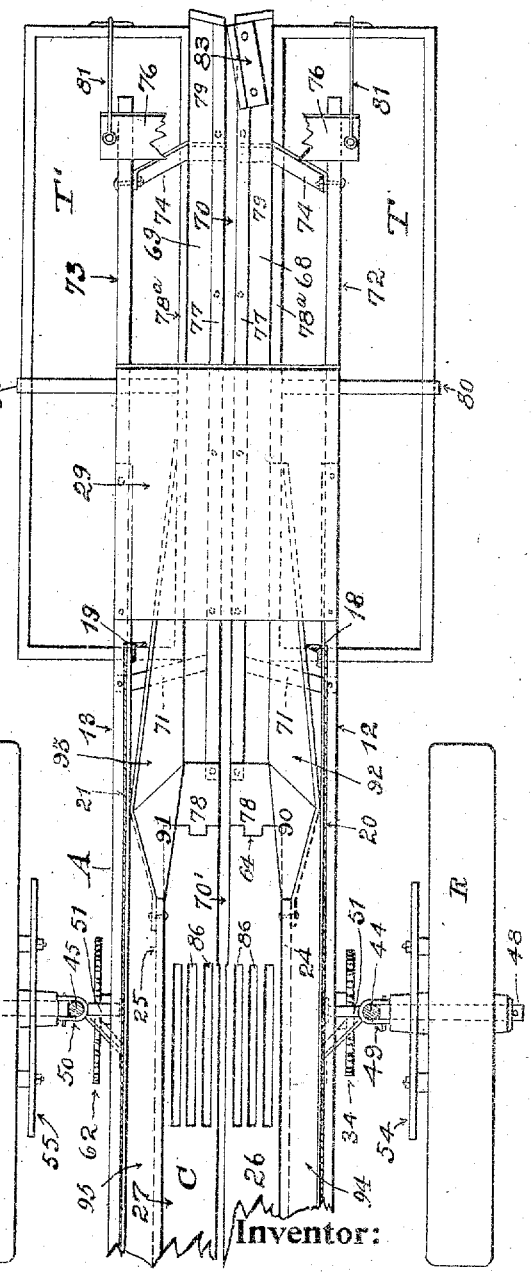

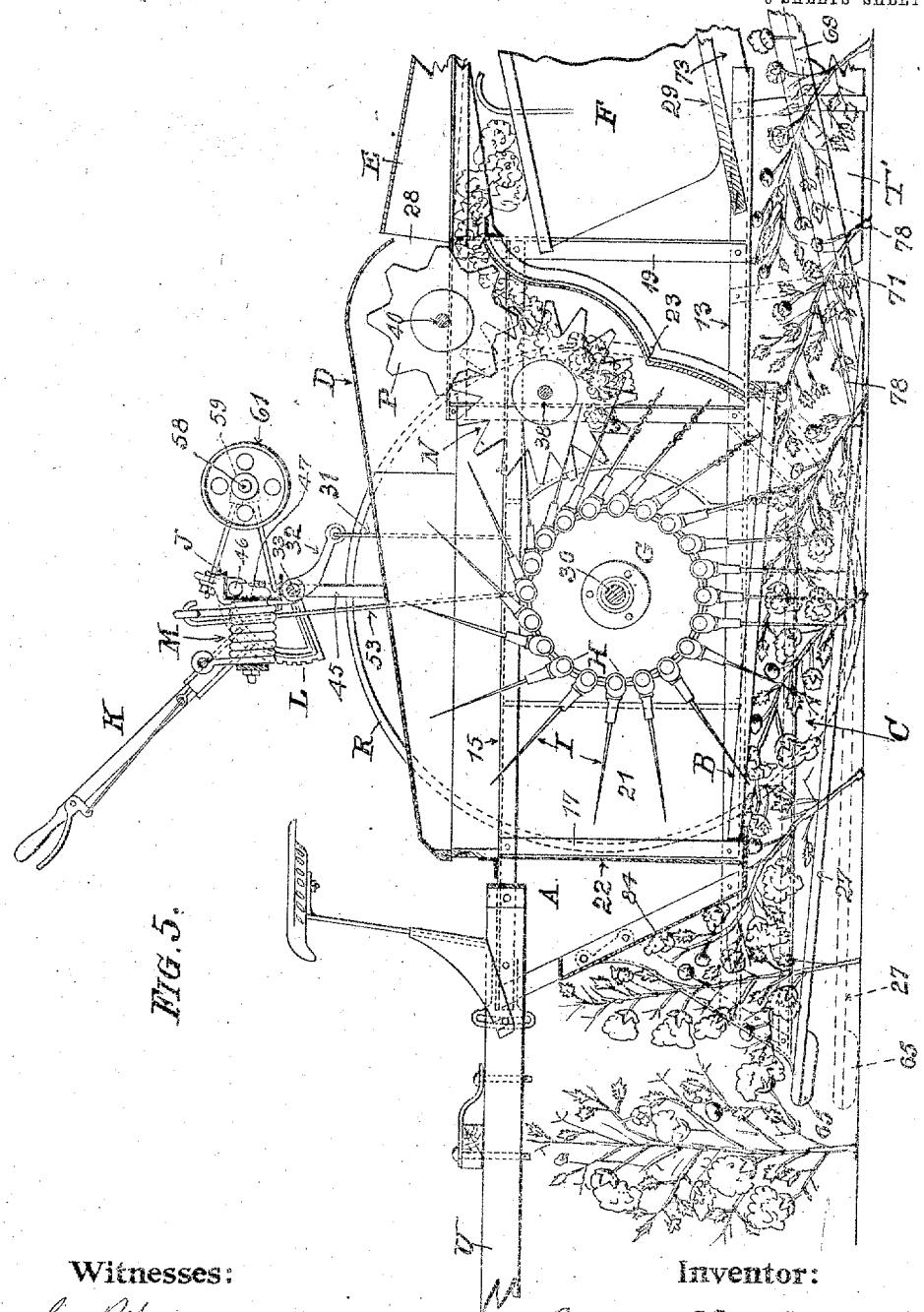

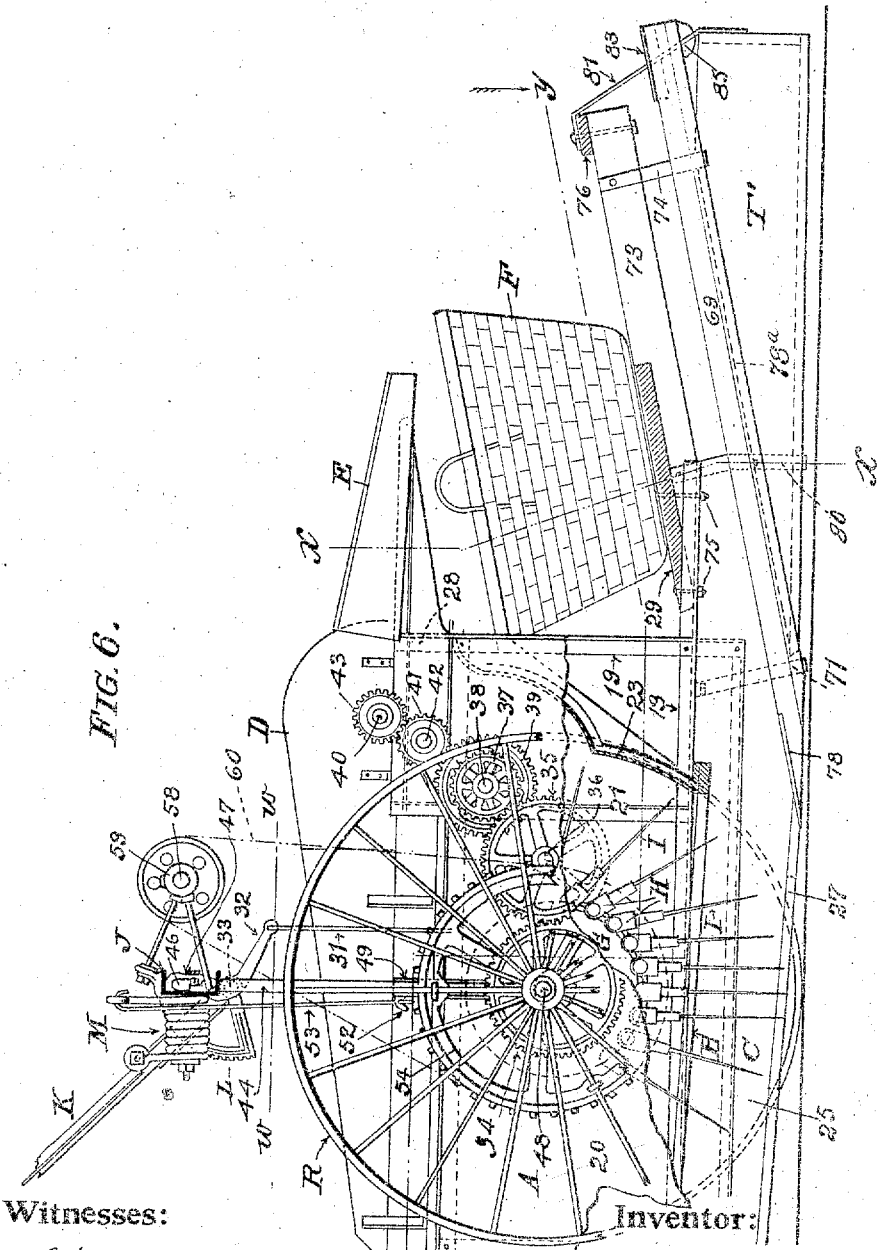

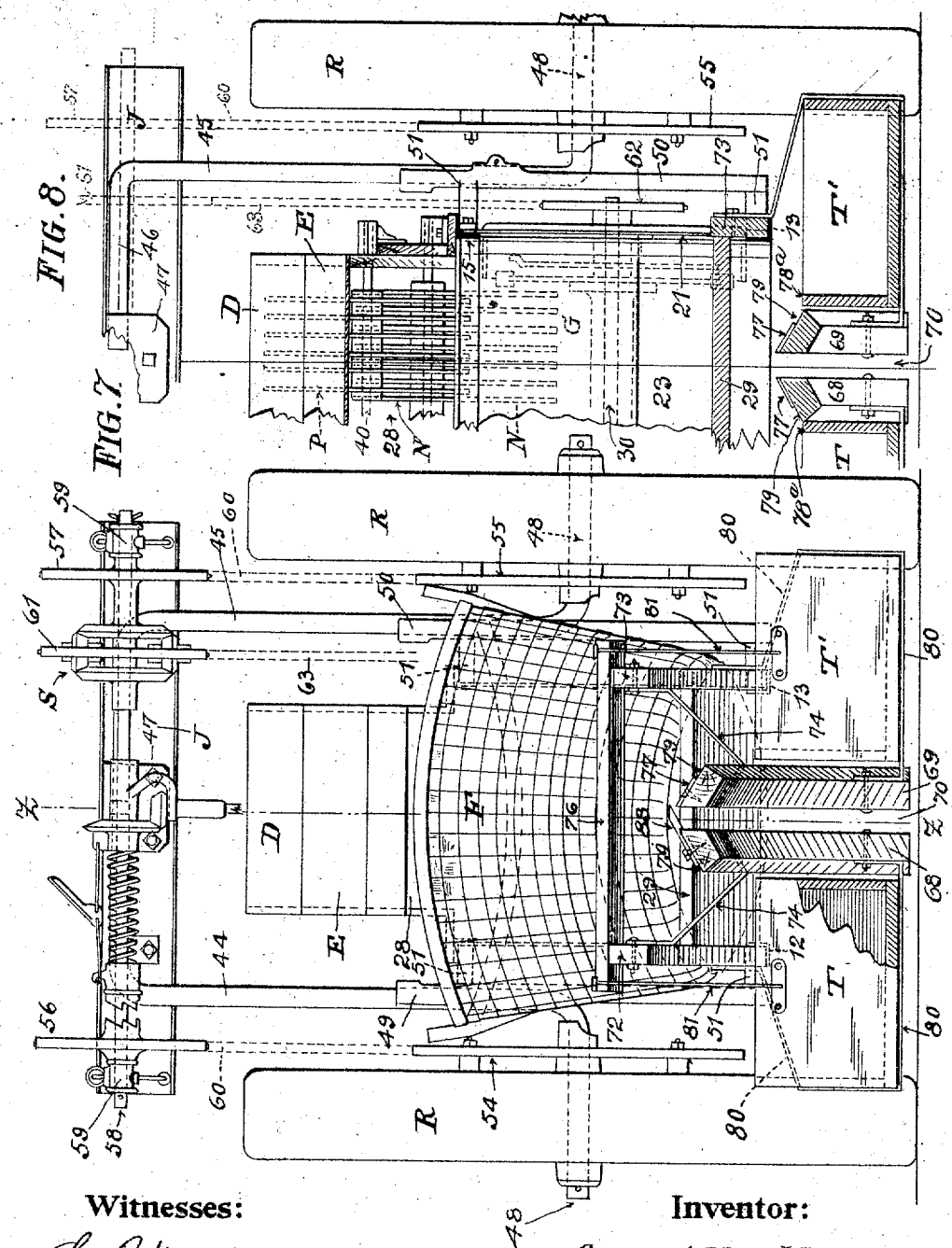

UNITED STATES PATENT OFFICE.

ORLEY C. HOUGHTON, OF CHICAGO, ILLINOIS, ASSIGNOR TO HENRY E. BULLOCK AND JAMES E. BULLOCK, BOTH OF CHICAGO, ILLINOIS.

COTTON-HARVESTING AND BOLL-GATHERING MACHINE.

986,059.  Specification of Letters Patent.  Patented Mar. 7, 1911.

Application filed February 26, 1910. Serial No. 546,174.

*To all whom it may concern:*

Be it known that I, ORLEY C. HOUGHTON, a citizen of the United States, and resident of Chicago, in the county of Cook and State of Illinois, have invented certain new and useful Improvements in Cotton-Harvesting and Boll-Gathering Machines; and I do hereby declare that the following description of my said invention, taken in connection with the accompanying sheets of drawings, forms a full, clear, and exact specification, which will enable others skilled in the art to which it appertains to make and use the same.

This invention has general reference to improvements in a combined cotton harvester and boll gatherer; and it consists, essentially, in the novel and peculiar combination of parts, and details of construction, as hereinafter first fully set forth and described, and then pointed out in the claims.

In the drawings already mentioned, which serve to illustrate this invention more fully, Figure 1 is an outline side elevation of the important features of my invention. Fig. 2 is a longitudinal sectional elevation of the same, illustrating particularly the guard employed in this machine and its connection with the boll-gathering device. Fig. 3 is a plan, partly in section, of the middle, and the rear-portion of the machine, the sectional portion being on line *y y* of Fig. 6, the picking mechanism and the grate being removed to disclose the underlying shelves and the peculiar construction of the channel in the machine body. Fig. 4 is a similar plan of the forward portion of the machine, on line *w w* of Fig. 6, the cotton picking mechanism being omitted in Figs. 3 and 4. Fig. 5 is a longitudinal sectional elevation taken on line *z z* of Fig. 7, of the forward and middle portion of the machine. Fig. 6 is a side elevation of the machine, a portion of one of the side-walls of the machine-body being broken away to disclose interior mechanism, in section, the sectional part being also on line *z z* of Fig. 7. Fig. 7 is a rear elevation of the machine, details of the cotton picking mechanism being omitted. Fig. 8 is a half-sectional elevation, looking forward of the machine, the section being on line *x x* of Fig. 6. Fig. 9 is a vertical cross section of the machine, on line *u, u,* of Fig. 1, looking to the rear of the machine, the picking mechanism located therein being omitted and a portion of the platform carrying the basket being cut away to disclose parts which could not otherwise be seen.

Like characters and symbols of reference indicate similar parts in all the figures.

The object of this invention is the production of a cotton harvester of the type which includes rotating picking-spindles operating within a channel located below the machine-body and adapted to receive cotton plant portions from which seed-cotton is being picked by said rotating picking spindles, provision being also made for harvesting the unripe and partly ripe bolls and collecting the same in a suitable receptacle attached to the machine. To accomplish this object, I construct this machine, substantially, as follows, prefacing the description, however, with the statement that while some of my improvements are especially adapted to the class of conton harvesters illustrated in the drawings, others, which will be particularly pointed out, are applicable to other classes of cotton picking machines.

Briefly described, this cotton harvester comprises a machine-body of substantially rectangular contour, which body is suspended from an overhead beam, said beam being supported by two, substantially Z-shaped round bars, one member of each bar forming the axle or spindle for a traction-wheel, the machine-body being adapted to be raised and lowered by appropriate mechanism. In this machine-body there is located a rotating cylinder the axis of which is in a horizontal plane, said cylinder being rotated by mechanism driven by the traction-wheels. This cylinder includes end-plates of circular contour, fixed upon said horizontal axis, and a series of columns journaled in said end-plates, there being in each of said columns a series of intermittently-rotating picking-spindles which rotate in vertical planes parallel with the movement of the machine. These picking-spindles enter, and are withdrawn from, said channel, said channel being, preferably, formed of four walls, two of which, viz., the upper and the lower horizontal walls being slotted to permit the passage of the picking-spindles, the remaining two, vertical walls being confining-walls to concentrate the cotton bushes within said channel. This type of cotton harvesters, is adapted only for picking cotton staple from cotton plants on which the ripe bolls have burst open and from which the lint can be extracted by the picking-spindles, but since cotton ripens gradually during several months, it is necessary to go over the field with the harvester several times, and then finally to pick those bolls that have only partly, or not at all opened, by hand, to be afterward treated in the cotton gins in the usual manner.

In my present machine I have combined, with the class of cotton pickers heretofore briefly referred to, means for removing the partly open, or entirely closed bolls from the branches and limbs of cotton plants at the same time that the staple is being picked from the bushes, and to collect these bolls in a receptacle separate from the receptacle receiving the collected staple.

A, in the drawings designates the machine-body. It is substantially rectangular structure built up from a special design, of angle-bars, and having its sides and its ends closed. This structure comprises two lower angle-bars 12, 13, and two upper angle-bars 14, 15, these bars being connected near their forward ends by vertical angle-bars 16, 17, and near their rear ends by vertical angle-bars 18, 19. To these angle bars are fastened sheet-metal plates, forming the sides of the machine-body, the angle-bars 12, 14, 16, and 18, being covered by the plate or side-wall 20, and the bars 13, 15, 17, and 19, by the plate or side-wall 21. The forward end of this machine-body is closed by a vertical plate or front-wall 22, and the rear end thereof is closed by a curved plate 23. The bottom of this machine-body is formed by a grate B, of usual construction, this grate B forming also the upper wall of a four-walled channel C, the side-walls of which are formed by vertical skirts 24, 25, and the lower wall of which is formed by two shelves 26, 27, which will be hereinafter more fully referred to.

The upper, open part of the machine-body, is closed by a removable cover or hood D leaving, however, at the rear end thereof an opening 28, through which the cotton staple is discharged, a rearwardly-projecting cover E, guiding the staple into a suitable receptacle F, located upon a platform 29.

Within the machine-body is located the picking-mechanism, including the cylinder G, comprising two circular disks mounted upon a shaft 30, horizontally traversing said machine-body, there being journaled in said disks a series of columns H, each of which is provided with a series of picking-spindles I, rotating intermittently while the said cylinder is rotating continuously around its axis 30. This cylinder is rotated by driving-mechanism hereinafter to be described, and its picking-spindles are arranged to pass through the slots or spaces of the grate B into, and out of, the channel C.

The machine-body is suspended from an overhead channel-beam J, by rods 31, which rods engage said machine-body at one of their ends, the opposite ends engaging levers 32, fastened to a shaft 33, located below the channel-beam J, and journaled in suitable bearings attached thereto. The outer end of this shaft 33 has a hand-lever K, provided with a dog of usual construction, engaging a notched quadrant L, in such manner that when the said hand-lever K is depressed, it will cause the machine-body to be lifted, a tension-spring device M, of known design, being provided to approximately balance the weight of the machine-body with its appurtenants, thereby relieving the hand-lever K from the weight of said parts.

The staple is picked from the cotton plant portions entering the channel C by the rotating picking-spindles I, and is pulled off said spindles by a series of stripping-wheels N, and from the latter by the cleaner P. This stripping-mechanism is rotated by means of a train of gearing, shown in detail in Figs. 6 and 8, and comprises a spur-wheel 34, placed on one end of the cylinder-shaft 30, and meshing with an intermediate gear-wheel 35, rotating upon a stud-shaft 36, and engaging a smaller gear-wheel 37 that is fastened upon the stripper-shaft 38 to rotate the same together with a larger gear-wheel 39, that communicates rotary movement to the cleaner P secured to the shaft 40, by a gear-wheel 43 thereon and an intermediate gear-wheel 41 revolving upon a stud-shaft 42.

As heretofore stated, the machine-body is suspended from the overhead channel-beam J, and this beam is carried by two, upwardly-projecting, preferably round, Z-shaped bars 44, 45, the upper members 46 of which are fastened to the channel-beam J by a centrally-located clamp 47. The lower, horizontal, members 48, of these bars serve as spindles for traction-wheels R. Upon each of these bars 44, 45, there is slidingly mounted a side-iron 49, 50, which have arms 51, that connect these side-irons with the sides of the machine-body. At the upper end of each of these side-irons is formed a crook 52, Fig. 6, to which a rod 53 is hooked that connects the side-irons with the suspension device M already referred to.

The cylinder G is rotated by two sprocket-wheels 54, 55, securely fastened to the traction-wheels R and rotating therewith. These sprocket-wheels connect with similar sprocket-wheels 56, 57, placed upon a shaft 58, located in the rear of the overhead channel-beam J, in suitably-arranged bearings 59, by proper drive-belts 60, shown in dotted lines in the several figures wherein they appear. Upon the shaft 58 there is also located a differential-gearing device S, Fig. 7, of usual construction and having a driving-sprocket 61, connecting with a driven sprocket 62 placed on the cylinder-shaft 30, by a suitable link-belt 63.

I have heretofore mentioned the guard comprising two shelves 26, 27. This guard is located very low in the channel C, so as to be in close proximity to the ground over which the machine is being moved when picking cotton, but is raised above the ground with the machine-body when the latter is raised by the hand-lever K to either clear an obstruction in the field, or when going to and from the field. And in order that the free ends of the picking spindles may not be interfered with when the guard members 26, 27, or either of them rises to pass over an obstruction of the ground over which the machine is being moved, these guard members are slotted at 86 to permit the free ends of these picking fingers to enter, and when necessary to pass through said slots 86. This guard has heretofore been pivoted at its forward end to the forward end of the machine and provided with means for raising and lowering its rear end, and in one instance known to me, made so that the rear end is free to follow the undulations of the ground over which the machine is being moved when picking cotton. This construction is, however, open to the objection that when the forward end of the guard is placed low enough to lift the lower branches of cotton plants from the ground, to lead them into the channel C, this forward end of the guard is liable to scoop up dirt, while, when placed high enough to avoid this objection, it will not effectively pick up the lower branches and loose cotton on the ground. To avoid this objection, I hinge the shelves 26, 27, at their rear end to hinge-members 64, Figs. 1, 2 and 3, so that the forward ends of said shelves are free to rise and fall, shoes 65, being placed underneath their forward end to slide over the ground and follow the undulations thereof, guides 66, being fastened to the shelves near their forward end, said guides having slotted apertures 67, engaging bolts 68ª, fastened in the skirts 24, 25, to limit the up-and-down movement of the forward end of said shelves. In this present instance I also carry the forward ends of said shelves 26 27 beyond the forward end of the machine so as to insure the lifting of the lower branches of cotton plants before entering the channel C.

Having thus described the mechanism that picks the cotton from the cotton plants, I shall now proceed to describe the means for removing the partly open and the closed bolls from these plants.

From the rear end of the grate lead two upwardly-rising beams 68, 69, placed a short distance apart only, so as to afford a narrow passage 70, between them, which passage is a continuation of the space 70' between the shelves 26, 27. The forward ends of these beams 68, 69, are carried by supporting-rods 71, while their rear ends are suspended from two beams 72, 73, by suspension-rods 74. These two latter beams which run substantially parallel with the beams 68, 69, are fastened with their forward ends to the rearwardly-extending portions of the lower angle-bars 12, 13, by screws 75, and they are connected at their rear ends by a cross-beam 76.

The upper edges of the beams 68, 69, are beveled, and these beveled surfaces 79, are faced with metallic strips 77, and their lower ends shod with plates 78, to prevent excessive wear. On both sides of these beams 68, 69, there are located receptacles T, T', the inner sides of which are inclined to bring their edges 78ª, even with, or below the lower edges of the upper inclined surfaces of said beams, the object of which will further on appear. These two receptacles are removably placed in position, their forward ends resting in stirrups 80, secured at one end to the beams 68, 69, and at their other ends to the upper inclined beams 72, 73, while the rear ends of said receptacles T, T', are suspended by rods 81, from the upper inclined beams 72, 73, said rods 81 having hooks 82, Fig. 1, engaging holes in the rear ends of said receptacles.

At the rear end of one of the beams 68, 69, and upon the upper inclined surface thereof is located a knife 83, projecting into the passage 70 between the two beams 68, 69, which knife serves to cut off those bolls from their limbs or branches that have not already been severed therefrom before reaching said knife.

The receptacles T, T', are removably placed on the machine that their contents of bolls, &c., may be readily dumped therefrom by removing said receptacles from the machine.

The side walls of the channel C at the forward end of the machine body are formed by the skirts 24, 25, and the outwardly flaring continuations 94, 95, thereof, the upper edges of which meet, and are screwed to, the lower horizontal angle-bars 12, 13, by screws, not shown. At the rear ends of these skirts this channel widens by the outwardly flaring walls 90, 91, so that the cotton plants, after having passed through the forward channel portion where the picking spindles enter to pick the cotton, may spread to permit the picking spindles to withdraw from the plants and to avoid, as much as possible, the stripping of cotton from these picking spindles by coming in contact with the limbs and branches of these plants. The rear portion of this channel C again contracts by the converging walls 92, 93, which terminate at the sides of the beams 68, 69, as illustrated in dotted lines in Fig. 3, to gradually gather the cotton plants and to finally enable them to pass through the space 70 between the beams 68, 69, without being broken or severed from the stalks or trunks of said plants.

The operation of this cotton picking machine is substantially, as follows: The machine is moved over a row of cotton plants by a team of horses harnessed to the pole U in the usual manner; the cotton plants meeting an apron 84, located at the forward end of the machine, are downwardly, and forwardly depressed, as shown in Fig. 5, and enter the channel C where the rotating picking-spindles I remove the cotton lint therefrom, which lint is stripped from the picking-spindles by the stripper N, and removed from the latter by the cleaner P, to be deposited in the staple-receiving basket F. The plants, after having passed the rear end of the grate B, pass bodily through the narrow space 70 between the upwardly slanting beams 68, 69, the branches of the plants sliding upon the upper, beveled surface thereof and gradually passing through said narrow passage. Any unripe bolls, which are usually larger than the narrow passage, 70, are pulled off their branches as the plants pass through the narrow passage, and drop over the inclined surface of the beams 68, 69, into the receptacles T, T', while any bolls that have not yet been severed from their limbs when reaching the knife 83, are cut off by the latter, and deposited in said receptacles T, T'. A depressor 85, at the rear ends of the beams 68, 69, depresses the cotton bushes as they reach the rear end of the narrow channel 70, to insure their passing through the same.

It will now be observed that by combining the boll-gathering means with the cotton picking mechanism, I am enabled to dispense with the hand-picking, thereby reducing the cost of picking cotton and the unripe and unopened bolls, to a great extent, and at the same time keep the seed-cotton separate from the trash.

I have heretofore described the boll-gathering means in connection with a cotton harvester of a specific type, but I desire it understood that I do not wish to confine myself to this particular type of cotton harvesting machines, for the reason that this boll-gathering device is applicable to most all, if not all cotton picking machines, for instance, the boll-gathering device is adapted for use in cotton harvesters having one or more cylinders provided with cotton picking means and revolving upon a vertically-disposed axis, wherein my boll-gathering device will be located in the rear of the cotton picking means, without change or modification.

I am also aware that many changes in the minor details of construction may be made without departing from the scope of my invention, which resides broadly speaking in combining with a cotton harvester, of means for removing, at the same time that seed-cotton is being picked from cotton plants, the unripe and un-opened bolls therefrom.

Having thus fully described this invention, I claim as new and desire to secure to me by Letters Patent of the United States—

1. A cotton harvester, comprising, in combination, a machine-body; cotton picking mechanism located therein and including rotating picking-spindles; a channel below said machine-body and including an upper, horizontal wall which is slotted to permit said picking-spindles to enter said channel and to withdraw therefrom, and a lower, substantially horizontal wall, said latter wall being pivoted at its rear end in said channel, its forward end being free to rise and fall to follow the undulations of the ground over which the machine is being moved while picking cotton lint from cotton plants that the said channel is adapted to receive.

2. A cotton harvester, comprising, in combination, a machine-body; cotton picking mechanism located therein and including rotating picking spindles; a channel below said machine-body and including an upper, horizontal wall which is slotted to permit said picking-spindles to enter said channel and to withdraw therefrom, and a lower, substantially horizontal wall, said latter wall comprising two shelves, said shelves being pivoted at their rear ends in said channel and free to rise and fall at their forward ends to follow the undulations of the ground over which the machine is being moved while picking cotton lint from the cotton plants that the said channel is adapted to receive.

3. A cotton harvester, comprising, in combination, a machine-body; cotton picking mechanism located therein and including rotating picking-spindles; a channel below said machine-body and including an upper, horizontal, wall which is slotted to permit said picking-spindles to enter said channel and to withdraw therefrom, and a lower substantially horizontal wall, said latter wall being pivoted at its rear end in said channel, its forward end being free to rise and fall to follow the undulations of the ground over which the machine is being moved while picking cotton lint from cotton plants that the said channel is adapted to receive, there being means on the forward end of said lower wall adapted to prevent said forward end from entering the ground.

4. A cotton harvester, comprising, in combination, a machine-body; cotton-picking mechanism located therein and including rotating picking-spindles; a channel below said machine-body and including an upper, horizontal, wall which is slotted to permit said picking-spindles to enter said channel and to withdraw therefrom, and a lower, substantially horizontal wall, said latter wall comprising two shelves, said shelves being pivoted at their rear ends in said channel, and free to rise and fall at their forward ends to follow the undulations of the ground over which the machine is being moved while picking cotton lint from cotton plants that said channel is adapted to receive, there being means on the forward end of each shelf adapted to prevent its forward end from entering the ground.

5. A cotton harvester, comprising, in combination, a machine-body; cotton picking mechanism located therein and including rotating picking-spindles; a channel below said machine-body and including an upper, horizontal wall which is slotted to permit said picking-spindles to enter said channel and to withdraw therefrom, and a lower, substantially horizontal wall, said latter wall being pivoted at its rear end in said channel, its forward end being free to rise and fall to follow the undulations of the ground over which the machine is being moved while picking cotton lint from cotton plants that the said channel is adapted to receive, there being means at the forward end of said lower wall adapted to limit the up-and-down movement of the forward end thereof.

6. A cotton harvester, comprising, in combination, a machine-body; cotton picking mechanism located therein and including rotating picking-spindles; a channel below said machine-body and including an upper, horizontal, wall which is slotted to permit said picking-spindles to enter said channel and to withdraw therefrom, and a lower, substantially horizontal wall, said latter wall comprising two shelves, said shelves being pivoted at their rear ends in said channel and free to rise and fall at their forward ends to follow the undulations of the ground over which the machine is being moved while picking cotton lint from the cotton plants that the channel is adapted to receive, there being means on each shelf adapted to limit the up-and-down movement of the forward ends of said shelves.

7. A cotton harvester, comprising, in combination, a machine-body; cotton picking mechanism located therein and including rotating picking-spindles; a channel below said machine-body and including an upper, horizontal, wall which is slotted to permit said picking-spindles to enter said channel and to withdraw therefrom, and a lower, substantially horizontal wall, said latter wall being pivoted at its rear end in said channel, its forward end being free to rise and fall to follow the undulations of the ground over which the machine is being moved while picking cotton lint from cotton plants that the said channel is adapted to receive, there being means on said lower wall adapted to prevent its forward end from entering the ground, and further means adapted to limit the up-and-down movement of the forward end of said lower wall.

8. A cotton harvester, comprising, in combination, a machine-body; cotton picking mechanism located therein and including rotating picking-spindles; a channel below said machine-body and including an upper, horizontal, wall which is slotted to permit said picking-spindles to enter said channel and to withdraw therefrom, and a lower, substantially horizontal, wall, said latter wall comprising two shelves, said shelves being pivoted at their rear ends in said channel, and free to rise and fall at their forward ends to follow the undulations of the ground over which the machine is being moved while picking cotton lint from cotton plants that said channel is adapted to receive, there being means on each shelf adapted to prevent its forward end from entering the ground, and further means adapted to limit the up-and-down movement of the forward end of each shelf.

9. A combined cotton harvesting and boll gathering machine, comprising, in combination, a machine body mounted on wheels, a channel in said machine body through which cotton plants are passed while cotton lint is being picked therefrom, cotton picking mechanism in said machine body adapted to operate in said cotton plants while they are passing through said channel to remove cotton lint therefrom, said channel including walls the lower one of which underlies lower branches of said cotton plants said lower wall being adapted to lift said branches into said channel, means adapted to remove said cotton lint from said cotton picking mechanism, a receptacle adapted to receive said separated cotton lint, means connected to, and forming a continuation and extension of, said lower wall said means being adapted to sever cotton bolls from said cotton plants after the loose cotton has been removed therefrom by said cotton picking mechanism, and a receptacle adapted to receive said severed cotton bolls, whereby the loose cotton lint and the cotton bolls are gathered and separated and deposited in separate receptacles at one movement of the machine over a row of cotton plants, as described.

10. A combined cotton harvesting and boll gathering machine, comprising, in combination, a machine body mounted on wheels, a channel in said machine body through which cotton plants are passed while cotton lint is being picked therefrom, cotton picking mechanism in said machine body adapted to operate in said cotton plants while they are passing through said channel to remove cotton lint therefrom, said channel including walls, the lower one of which underlies branches of said cotton plants said lower wall being adapted to lift said branches into said channel, means adapted to remove said cotton lint from said cotton picking mechanism, a receptacle adapted to receive said separated cotton lint, means forming a continuation and extension of said lower wall adapted to sever cotton bolls from said plants, after the loose cotton has been removed therefrom by said cotton picking mechanism, said means including two rearwardly and upwardly projecting beams spaced apart to permit limbs and branches of said cotton plants to pass out of said channel through the space between said beams but to intercept cotton bolls, and a receptacle adapted to receive said severed cotton bolls, as described.

11. A combined cotton harvesting and boll gathering machine, comprising, in combination, a machine body mounted on wheels, a channel in said machine body through which cotton plant portions are passed while cotton lint is being picked therefrom, cotton picking mechanism in said machine body adapted to operate in said cotton plants during their passage through said channel, said channel including walls the lower one of which underlies branches of said cotton plants, said lower wall being adapted to lift said branches into said channel, means adapted to remove said cotton lint from said cotton picking mechanism, a receptacle adapted to receive said separated cotton lint, means projecting rearwardly and upwardly from said machine body and forming a continuation and extension of said lower channel wall, said means being adapted to sever cotton bolls from said cotton plants after the cotton lint has been removed therefrom by said cotton picking mechanism, and a receptacle adapted to receive said severed cotton bolls, said means for severing said bolls being attached to said machine body, as described.

12. In a combined cotton harvesting and boll gathering machine, the combination, of a machine body mounted on wheels, cotton lint picking mechanism in said machine body, a channel in said machine body through which cotton plant portions are caused to pass, said cotton picking mechanism being adapted to remove cotton lint from said cotton plant portions while the latter are passing through said channel, a receptacle adapted to receive said removed cotton lint, means forming a continuation and extension of said channel adapted to sever cotton bolls from said plants after the lint has been removed therefrom by said lint picking mechanism, said boll gathering means including rearwardly and upwardly projecting beams spaced sufficiently apart to permit limbs and branches of said cotton plants to pass out of said channel through the space between the beams but to intercept cotton bolls, means for securing said beams to said machine body, and a receptacle or receptacles adapted to receive said severed bolls.

13. In a combined cotton harvesting and boll gathering machine, the combination, of a machine body mounted on wheels, cotton lint picking mechanism in said machine body, a channel in said machine body through which cotton plant portions are caused to pass, said cotton picking mechanism being adapted to remove cotton lint from said cotton plant portions while the latter are passing through said channel, a receptacle adapted to receive said removed cotton lint, means forming a continuation and extension of said channel adapted to sever cotton bolls from said plants after the lint has been removed therefrom by said lint picking mechanism, said boll gathering means including rearwardly and upwardly projecting beams spaced sufficiently apart to permit limbs and branches of said cotton plants to pass out of said channel through the space between said beams but to intercept cotton bolls, means for securing said beams to said machine body, and a receptacle or receptacles adapted to receive said severed bolls, said receptacle or receptacles being removable from the boll severing means.

14. In a cotton harvesting and boll gathering machine combined, the combination, of a machine body mounted on wheels, cotton lint picking mechanism in said machine body, a channel in said machine body through which cotton plant portions are caused to pass, said cotton picking mechanism being adapted to remove cotton lint from said cotton plants while the latter are passing through said channel, a receptacle adapted to receive said removed cotton lint, said channel including walls the lower one of which underlies lower branches of said plants to lift them into said channel, means connected to, and forming a continuation and extension of said lower channel wall adapted to remove cotton bolls from said plants after the lint has been removed therefrom by said lint-picking mechanism, and a receptacle adapted to receive said removed cotton bolls, said means for removing said cotton bolls being connected to the lower channel wall at the rear end thereof, supports adapted to sustain the rear end of said boll removing means, said boll receiving receptacle being connected to said boll removing means and removable therefrom.

15. In a combined cotton harvesting and boll gathering machine, the combination, of a machine body mounted on wheels, cotton lint picking mechanism in said machine body, a channel in said machine body through which cotton plant portions are caused to pass, said cotton lint picking mechanism being adapted to remove the cotton lint from said cotton plants while the latter are passing through said channel, a receptacle adapted to receive said removed cotton lint, said channel including walls the lower one of which underlies lower branches of said plants to lift them into said channel, means adapted to remove bolls from said plants after the lint has been removed therefrom by said lint picking mechanism, said boll removing means including rearwardly and upwardly projecting beams spaced sufficiently apart to permit limbs and branches of said cotton plants to pass out of said channel through the space between said beams but to intercept cotton bolls, said beams being connected at their forward ends to the rear end of said lower channel wall and forming a continuation and extension thereof, means for suspending the rear ends of said beams from said machine body, and a receptacle on the outer side of each of said beams adapted to receive said removed bolls, said receptacles for said removed bolls being connected to, and removable from said boll removing means.

16. In a combined cotton harvesting and boll gathering machine, the combination, of a machine body mounted on wheels, cotton picking mechanism located in said machine body, a channel in said machine body through which cotton plant portions are caused to pass, said cotton picking mechanism being adapted to remove the cotton lint from said plants while the latter are passing through said channel, a receptacle adapted to receive said removed lint, said channel including walls the lower one of which underlies branches of said cotton plants to lift them into said channel, means adapted to remove bolls from said plants after the lint has been removed therefrom by said lint picking mechanism, said boll removing means forming a continuation and extension of the lower channel wall and projecting rearwardly and upwardly therefrom, two supports secured to said machine body and adapted to sustain the rear end of said boll removing means, and a receptacle adapted to receive said removed bolls.

17. In a combined cotton harvesting and boll gathering machine, the combination, of a machine body mounted on wheels, cotton picking mechanism located therein, a channel in said machine body through which cotton plant portions are caused to pass, said cotton picking mechanism being adapted to remove cotton lint from said plants while the latter are passing through said channel, a receptacle adapted to receive said cotton lint, said channel including walls the lower one of which underlies lower branches of said cotton plants to lift them into said channel, means adapted to remove bolls from said plants after the lint has been removed therefrom by said lint picking mechanism, said boll removing means forming a continuation and extension of the lower channel wall and projecting upwardly and rearwardly therefrom, two supporting beams secured to said machine body and adapted to sustain the rear end of said boll removing means, and two receptacles adapted to receive said removed bolls, said receptacles being located one on each side of said boll removing means and removably connected thereto.

18. In a combined cotton harvesting and boll gathering machine, the combination, of a machine body mounted on wheels, cotton picking mechanism located therein, a channel in said machine body through which cotton plant portions are caused to pass, said cotton picking mechanism being adapted to remove cotton lint from said plants while the latter are passing through said channel, a receptacle adapted to receive said cotton lint, said channel including walls the lower one of which underlies lower branches of said cotton plants to lift them into said channel, means adapted to remove bolls from said plants after the lint has been removed therefrom by said lint picking mechanism, said boll removing means forming a continuation and extension of said lower channel wall and comprising two rearwardly and upwardly projecting beams, said beams being connected with their forward ends to the rear end of said lower channel wall, two supporting beams secured to said machine body and adapted to sustain the rear ends of said boll removing beams, and two receptacles adapted to receive said removed bolls, said receptacles being located one on each outer side of said boll removing beams and removably connected thereto.

19. In a combined cotton harvesting and boll gathering machine, the combination, of a machine body mounted on wheels, cotton picking mechanism located in said machine body, a channel in said machine body through which cotton plant portions are caused to pass, said cotton picking mechanism being adapted to remove cotton lint from said plant portions while the latter are passing through said channel, means adapted to remove bolls from said plant portions after the cotton picking mechanism has removed the lint therefrom, said channel having a lower wall underlying lower branches of said plants, said boll removing means forming a continuation and extension of said lower channel wall, the said lower channel wall being pivoted at its rear end in said channel in front of the boll gathering means, the forward end of said lower channel wall being free to rise and fall to follow the undulations of the ground over which the machine is being moved.

20. In a combined cotton harvesting and boll gathering machine, the combination, of a machine body mounted on wheels, cotton picking mechanism located in said machine body, a channel in said machine body through which cotton plant portions are caused to pass, said cotton picking mechanism being adapted to remove cotton lint from said plant portions while the latter are passing through said channel, a receptacle adapted to receive said removed cotton lint, means for removing bolls from said plant portions including two rearwardly and upwardly projecting beams forming a continuation and extension of said channel, said beams being in parallel spaced relation and adapted to permit limbs and branches of said plant portions to pass out of said channel through the space between said beams but to intercept the bolls thereof, there being near the end of said beams a cutting knife diagonally disposed across said space, the upper edges of said beams being beveled, and a receptacle on the outer side of each beam adapted to receive the removed bolls.

21. In a combined cotton harvesting and boll gathering machine, the combination, of a machine body mounted on wheels, cotton picking mechanism located therein and adapted to remove cotton lint from cotton plants over which the machine body is moved, and means connected to the rear end of said machine body and forming a continuation, an extension and integral part thereof adapted to remove bolls from said cotton plants after the lint has been removed therefrom by the cotton picking mechanism, said cotton lint picking mechanism including rotating picking spindles, said boll removing means including upwardly and rearwardly projecting beams spaced in parallel relation to permit the branches and limbs of said plants to pass therethrough but to intercept said bolls and remove them from said limbs and branches.

In testimony that I claim the foregoing as my invention, I have hereunto set my hand in the presence of two subscribing witnesses.

ORLEY C. HOUGHTON.

Attest:
MICHAEL J. STARK,
RICHARD J. WUERST.